Figure 1:
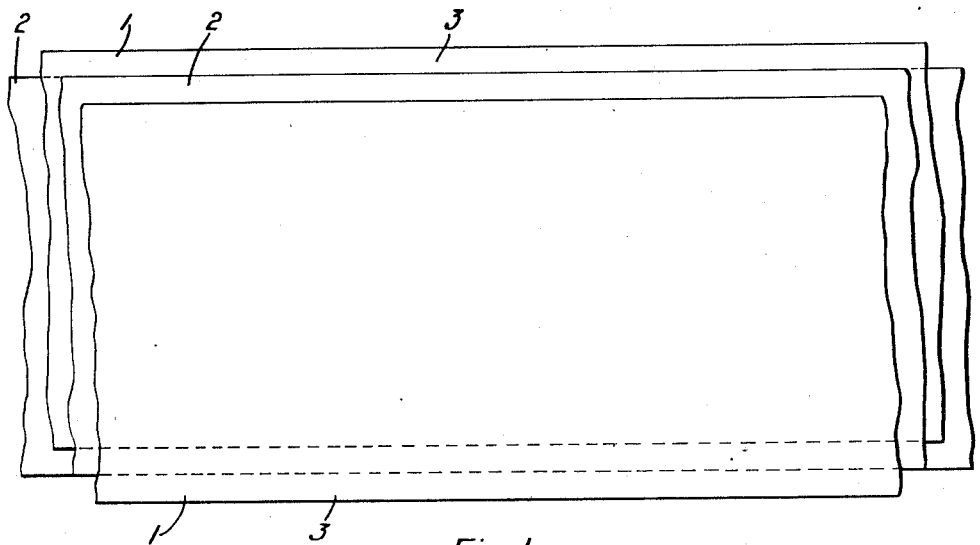

Sept. 11, 1923.

P. E. DEMMLER 1,467,777

CONDENSER AND METHOD OF MAKING THE SAME

Filed Feb. 15, 1919

WITNESSES:
H. T. Shelhamer
O. E. Bee.

INVENTOR
Paul E. Demmler
BY
Wesley G. Carr
ATTORNEY

Patented Sept. 11, 1923.

1,467,777

UNITED STATES PATENT OFFICE.

PAUL E. DEMMLER, OF PITTSBURGH, PENNSYLVANIA, ASSIGNOR TO WESTINGHOUSE ELECTRIC & MANUFACTURING COMPANY, A CORPORATION OF PENNSYLVANIA.

CONDENSER AND METHOD OF MAKING THE SAME.

Application filed February 15, 1919. Serial No. 277,292.

*To all whom it may concern:*

Be it known that I, PAUL E. DEMMLER, a citizen of the United States, and a resident of Pittsburgh, in the county of Allegheny and State of Pennsylvania, have invented a new and useful Improvement in Condensers and Methods of Making the Same, of which the following is a specification.

My invention relates to condensers, and it has, for its primary object, the provision of a method by which a product of high efficiency and exceptional durability may be formed.

One object of my invention is to so wind alternate sheets of foil and an insulating material as to form a condenser of desired capacity and to so dispose the windings as to provide an exceptionally large contact area for the terminals thereof.

Another object of my invention is to construct condensers in which the conducting material shall be disposed in as close relation as possible and thereby obtain a high efficiency.

A still further object of my invention is to construct a condenser of material which will insure a good product and which is readily available and comparatively inexpensive.

With these and other objects in view, my invention will be more fully described, illustrated in the drawings, in the several views of which corresponding numerals indicate like parts, and then particularly pointed out in the claims.

Figure 2:
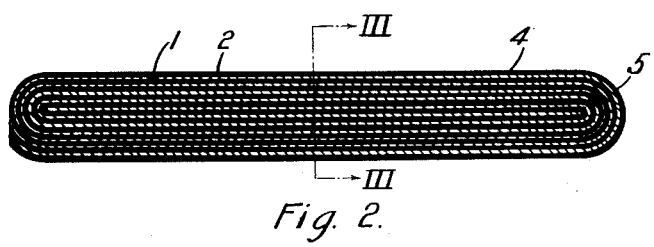
Figure 3:

In the drawings, Fig. 1 is a plan view, parts being broken away, of strips of material assembled in readiness to be formed into a condenser in accordance with my invention; Fig. 2 is a sectional view of the windings of material constituting a condenser embodying my invention, and Fig. 3 is a sectional view taken substantially along the line III—III of Fig. 2.

In practising my invention, I may construct a condenser by employing metal foil and strips or sheets of insulating material. The sheets of insulating material and foil may be assembled in alternate relation, with the foil sheets preferably staggered, so that the edges of alternate sheets shall project from opposite edges of the assembled material. The material thus assembled may then be wound to the desired shape and subjected to treatment in a bath of any suitable molten wax to expel the air from between the several windings. The edges of the foil projecting from the superimposed windings may be pressed together to provide a large area of conducting material to which the terminals of the condenser may be fastened. By staggering the metal foil sheets comprising the condenser, exceptionally good terminal contacts are provided and, for this reason, the electric losses of the condenser are materially reduced and, consequently, the efficiency is increased.

In Fig. 1 are shown strips of foil 1 and strips of insulating material 2 assembled preparatory to winding them to form a condenser. As here shown, the strips of metal foil 1 are disposed in staggered relation so that the edges 3 of alternate foil sheets project from opposite sides of the assembled material. The foil sheets may be made of any suitable material, such as aluminum or an alloy of lead and tin, and the insulating sheets may be any suitable material possessing sufficient dielectric strength and of sufficient pliability to permit of being wound in superposed relation.

I have found, however, that an insulating material which may be employed to great advantage may be provided by subjecting a metal foil to a bath of baking varnish. The metal foil may be drawn through the bath of baking varnish and through a drying tower to harden the film of varnish which will adhere to the foil. This operation of treating the metal foil in the bath of varnish and in a drying tower may be repeated as often as desired to obtain the required thickness of film on the foil. The film of varnish on the foil may be removed therefrom to obtain a relatively thin sheet of insulating material which possesses a high dielectric strength, as well as being tough and pliable.

As shown in Fig. 2, the foil 1, shown in cross section and the insulating material 2, shown in elevation to clearly distinguish them, may be wound to form a comparatively flat body 4 having rounded end portions 5. After the material has been wound, it may be subjected to treatment in a bath of molten wax in order to expel the air from between the windings. The wound condenser may then have its projecting edge portions 3 of the metal foil pressed together and secured in place as indicated at 6. Terminals may be connected to the condenser along the connected edge portions and, by so doing, an exceptionally large contact area may be provided, on account of the fact that the terminals engage the foil sheets throughout their entire widths.

In Figs. 2 and 3, the thicknesses of the insulating material and the foil are shown as greatly exagerated in order to clearly disclose the disposition of the different materials. It will be obvious, however, that the metal foil and the insulating material, being both relatively thin, form a flat body having projecting edge portions of foil which may be easily pressed together to provide the desired contact surfaces. A condenser thus formed may, of course, be disposed within a suitable casing, not shown in the drawings. The casing may be of any insulating material having sufficient mechanical strength to protect the windings from injury.

Although I have specifically described a condenser formed in accordance with my invention, it is obvious that slight changes may be made in the construction thereof, without departing from the spirit of my invention, and I desire, therefore, that no limitations shall be imposed except such as are indicated in the appended claims.

I claim as my invention:

1. A condenser comprising superimposed windings of a plurality of alternate strips of metal foil and a plurality of self-sustaining flexible strips of hardened varnish, the strips of foil being disposed in staggered relation with respect to each other and the projecting edge portions of the several convolutions of each foil being secured together.

2. A condenser comprising superimposed windings of a plurality of alternate strips of metal foil and a plurality of strips of self-sustaining baking varnish, the strips of foil being disposed in staggered relation with respect to each other, the projecting edge portions of the several convolutions of each foil being secured together, and the windings being embedded in a suitable wax.

In testimony whereof, I have hereunto subscribed my name this 31st day of Jan., 1919.

PAUL E. DEMMLER.